US 11,187,805 B2

(12) United States Patent
Namba et al.

(10) Patent No.: US 11,187,805 B2
(45) Date of Patent: Nov. 30, 2021

(54) IMAGE ACQUIRING APPARATUS FOR VEHICLE, CONTROL DEVICE, VEHICLE HAVING IMAGE ACQUIRING APPARATUS FOR VEHICLE OR CONTROL DEVICE, AND IMAGE ACQUIRING METHOD FOR VEHICLE

(71) Applicant: KOITO MANUFACTURING CO., LTD., Tokyo (JP)

(72) Inventors: Takanori Namba, Shizuoka (JP); Masayasu Ito, Shizuoka (JP); Mitsuharu Mano, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 440 days.

(21) Appl. No.: 16/065,016

(22) PCT Filed: Dec. 1, 2016

(86) PCT No.: PCT/JP2016/085815
§ 371 (c)(1),
(2) Date: Jun. 21, 2018

(87) PCT Pub. No.: WO2017/110418
PCT Pub. Date: Jun. 29, 2017

(65) Prior Publication Data
US 2018/0372869 A1    Dec. 27, 2018

(30) Foreign Application Priority Data

Dec. 21, 2015  (JP) ................................. 2015-248829
Dec. 21, 2015  (JP) ............................. JP2015-248830

(51) Int. Cl.
*G01S 17/10*    (2020.01)
*G01S 17/89*    (2020.01)
(Continued)

(52) U.S. Cl.
CPC ............ *G01S 17/10* (2013.01); *B60R 21/013* (2013.01); *G01S 7/483* (2013.01); *G01S 17/18* (2020.01); *G01S 17/89* (2013.01); *G01S 17/931* (2020.01)

(58) Field of Classification Search
CPC .... G01S 13/522; G01S 13/5248; G01S 7/415; G01S 13/726; G01S 7/2926; G01S 7/411;
(Continued)

(56) References Cited

U.S. PATENT DOCUMENTS

| 3,895,388 A | 7/1975 | Townsend |
| 5,029,009 A | 7/1991 | Ulich et al. |

(Continued)

FOREIGN PATENT DOCUMENTS

| CN | 1345095 A | 4/2002 |
| CN | 1744789 A | 3/2006 |

(Continued)

OTHER PUBLICATIONS

Extended European Search Report issued in counterpart European Patent Application No. 16878311.6, dated Jul. 22, 2019 (6 pages).
(Continued)

*Primary Examiner* — Luke D Ratcliffe
(74) *Attorney, Agent, or Firm* — Osha Bergman Watanabe & Burton LLP

(57) ABSTRACT

An image acquiring apparatus for a vehicle includes a light emitting unit configured to emit pulse light to a predetermined direction, an image acquisition unit configured to acquire a plurality of different images of target distance ranges by imaging reflected light returning from the target distance ranges at imaging timings set according to the target distance ranges, and a timing controller configured to control a light emission cycle of the pulse light and the imaging timings. The timing controller is configured to control the
(Continued)

light emission cycle and the imaging timings such that the light emission cycle and the imaging timings are modulated by random numbers.

7 Claims, 12 Drawing Sheets

(51) Int. Cl.
  *G01S 17/18* (2020.01)
  *B60R 21/013* (2006.01)
  *G01S 7/483* (2006.01)
  *G01S 17/931* (2020.01)

(58) Field of Classification Search
  CPC ........... G01S 13/0209; G01S 2013/466; G01S 13/886
  See application file for complete search history.

(56) References Cited

U.S. PATENT DOCUMENTS

| | | | |
|---|---|---|---|
| 5,118,180 | A | 6/1992 | Wichmann et al. |
| 5,864,391 | A | 1/1999 | Hosokawa et al. |
| 6,115,511 | A | 9/2000 | Sakai et al. |
| 6,311,020 | B1 | 10/2001 | Torikoshi |
| 7,956,988 | B1 | 6/2011 | Moran |
| 10,203,399 | B2 * | 2/2019 | Retterath ............... G01S 17/10 |
| 2002/0039087 | A1 | 4/2002 | Inukai |
| 2002/0051128 | A1 | 5/2002 | Aoyama |
| 2002/0052711 | A1 | 5/2002 | Aoyama |
| 2002/0149694 | A1 | 10/2002 | Seo |
| 2003/0155513 | A1 | 8/2003 | Remillard et al. |
| 2006/0050979 | A1 | 3/2006 | Kawahara |
| 2006/0055244 | A1 | 3/2006 | Ito et al. |
| 2006/0171703 | A1 | 8/2006 | Abe et al. |
| 2006/0215040 | A1 | 9/2006 | Sugawara |
| 2007/0058038 | A1 | 3/2007 | David et al. |
| 2007/0200747 | A1 | 8/2007 | Okai et al. |
| 2008/0007429 | A1 | 1/2008 | Kawasaki et al. |
| 2008/0157678 | A1 | 7/2008 | Ito et al. |
| 2009/0040500 | A1 | 2/2009 | Nishiuchi |
| 2010/0053365 | A1 | 3/2010 | Abe et al. |
| 2010/0109938 | A1 * | 5/2010 | Oswald ............... G01S 13/522 342/90 |
| 2010/0181914 | A1 | 7/2010 | Kasaba et al. |
| 2010/0207806 | A1 | 8/2010 | Takahashi et al. |
| 2010/0283845 | A1 | 11/2010 | Yokochi et al. |
| 2011/0091197 | A1 | 4/2011 | Lee et al. |
| 2011/0311130 | A1 | 12/2011 | Ichimori |
| 2012/0002050 | A1 | 1/2012 | Taniguchi et al. |
| 2012/0069176 | A1 | 3/2012 | Park et al. |
| 2012/0075534 | A1 | 3/2012 | Katz et al. |
| 2012/0200757 | A1 | 8/2012 | Kasahara |
| 2012/0249781 | A1 | 10/2012 | Vollmerhausen |
| 2012/0307230 | A1 | 12/2012 | Dorrington et al. |
| 2012/0320219 | A1 | 12/2012 | David et al. |
| 2013/0004021 | A1 | 1/2013 | Nagaoka et al. |
| 2013/0188022 | A1 | 7/2013 | Katz et al. |
| 2014/0139133 | A1 | 5/2014 | Kawasaki |
| 2014/0375815 | A1 | 12/2014 | Kanou et al. |
| 2015/0022712 | A1 | 1/2015 | Koishi |
| 2015/0125032 | A1 | 5/2015 | Yamanaka et al. |
| 2015/0160340 | A1 | 6/2015 | Grauer et al. |
| 2015/0202939 | A1 | 7/2015 | Stettner et al. |
| 2015/0241564 | A1 | 8/2015 | Takano |
| 2016/0012307 | A1 | 1/2016 | Morishita |
| 2016/0061952 | A1 | 3/2016 | Tsuji et al. |
| 2016/0182832 | A1 | 6/2016 | Koishi |
| 2016/0344965 | A1 | 11/2016 | Grauer et al. |
| 2016/0365846 | A1 | 12/2016 | Wyland |
| 2017/0156673 | A1 | 6/2017 | Uchida et al. |
| 2017/0212220 | A1 | 7/2017 | Dahlmann |

FOREIGN PATENT DOCUMENTS

| | | |
|---|---|---|
| CN | 1765120 A | 4/2006 |
| CN | 1838731 A | 9/2006 |
| CN | 1977527 A | 6/2007 |
| CN | 101209691 A | 7/2008 |
| CN | 101324749 A | 12/2008 |
| CN | 101644887 A | 2/2010 |
| CN | 101784147 A | 7/2010 |
| CN | 101933065 A | 12/2010 |
| CN | 102043224 A | 5/2011 |
| CN | 102316306 A | 1/2012 |
| CN | 202305416 U | 7/2012 |
| CN | 102629972 A | 8/2012 |
| CN | 102737389 A | 10/2012 |
| CN | 102783144 A | 11/2012 |
| CN | 102792333 A | 11/2012 |
| CN | 103744078 A | 4/2014 |
| CN | 104041022 A | 9/2014 |
| CN | 104364824 A | 2/2015 |
| CN | 104380166 A | 2/2015 |
| DE | 60125683 T2 | 4/2007 |
| DE | 102009045600 A1 | 4/2011 |
| JP | S56-164969 A | 12/1981 |
| JP | S59-117981 U1 | 8/1984 |
| JP | S59-198377 A | 11/1984 |
| JP | H04-215089 A | 8/1992 |
| JP | H07-043451 A | 2/1995 |
| JP | H07-325152 A | 12/1995 |
| JP | H08065690 A | 3/1996 |
| JP | H09-257927 A | 10/1997 |
| JP | H09-274076 A | 10/1997 |
| JP | H10132932 A | 5/1998 |
| JP | 2000-172995 A | 6/2000 |
| JP | 2000172995 A | 6/2000 |
| JP | 2004-157061 A | 6/2004 |
| JP | 2005-271836 A | 10/2005 |
| JP | 2007-232498 A | 9/2007 |
| JP | 2007-271373 A | 10/2007 |
| JP | 2008-033872 A | 2/2008 |
| JP | 2008-070999 A | 3/2008 |
| JP | 2008-298741 A | 12/2008 |
| JP | 2009-031165 A | 2/2009 |
| JP | 2009-092555 A | 4/2009 |
| JP | 2009-192359 A | 8/2009 |
| JP | 2009-257981 A | 11/2009 |
| JP | 2009-257983 A | 11/2009 |
| JP | 2009-258015 A | 11/2009 |
| JP | 2009-258015 A * | 11/2009 |
| JP | 2010-048716 A | 3/2010 |
| JP | 2010-054461 A | 3/2010 |
| JP | 2010-061304 A | 3/2010 |
| JP | 2010-066221 A | 3/2010 |
| JP | 2010066221 A | 3/2010 |
| JP | 2010170449 A | 8/2010 |
| JP | 2010212042 A | 9/2010 |
| JP | 2010-256291 A | 11/2010 |
| JP | 2011-013950 A | 1/2011 |
| JP | 2011136651 A | 7/2011 |
| JP | 2012-220366 A | 11/2012 |
| JP | 2013-096905 A | 5/2013 |
| JP | 2013-160585 A | 8/2013 |
| JP | 2013546222 A | 12/2013 |
| JP | 2014160408 A | 9/2014 |
| JP | 2015-510586 A | 4/2015 |
| JP | 2015-135273 A | 7/2015 |
| WO | 2014/097539 A1 | 6/2014 |
| WO | 2015/001550 A1 | 1/2015 |

OTHER PUBLICATIONS

International Search Report issued in PCT/JP2016/085815 dated Feb. 28, 2017 (9 pages).
Written Opinion of the International Searching Authority issued in PCT/JP2016/085815 dated Feb. 28, 2017 (5 pages).
Office Action issued in Japanese Application No. 2017-557837, dated Oct. 13, 2020 (13 pages).

(56) References Cited

OTHER PUBLICATIONS

Office Action issued in corresponding Chinese Application No. 201680075213.8; dated Jun. 3, 2021 (13 pages).
International Search Report issued in PCT/JP2016/085811 dated Feb. 28, 2017 (2 pages).
Written Opinion issued in PCT/JP2016/085811 dated Feb. 28, 2017 (7 pages).
Extended European Search Report issued in counterpart European Patent Application No. 16878307.4, dated Jul. 22, 2019 (7 pages).
International Search Report issued in PCT/JP2016/085810 dated Feb. 28, 2017 (4 pages).
Written Opinion issued in PCT/JP2016/085810 dated Feb. 28, 2017 (6 pages).
Extended European Search Report issued in counterpart European Patent Application No. 16878306.6, dated Jul. 22, 2019 (7 pages).
Office Action issued in Japanese Application No. 2017-557832, dated Jun. 30, 2020 (18 pages).
Office Action issued in Japanese Application No. 2017-557832, dated Jan. 5, 2021 (16 pages).
International Search Report issued in PCT/JP2016/085814 dated Feb. 28, 2017 (5 pages).
Written Opinion issued in PCT/JP2016/085814 dated Feb. 28, 2017 (7 pages).
Extended European Search Report issued in counterpart European Patent Application No. 16878310.8, dated Jul. 22, 2019 (7 pages).
Office Action issued in Japanese Application No. 2017-557836, dated Jun. 30, 2020 (13 pages).
Office Action issued in Japanese Application No. 2017-557836, dated Oct. 13, 2020 (19 pages).
Office Action issued in corresponding Chinese Application No. 201680075214.2; dated Jun. 16, 2021 (25 pages).
Office Action issued in corresponding European Application No. 16878306.6; dated Jun. 17, 2021 (8 pages).
International Search Report issued in PCT/JP2016/085813 dated Feb. 21, 2017 (2 pages).
Written Opinion issued in PCT/JP2016/085813 dated Feb. 21, 2017 (5 pages).
Extended European Search Report issued in counterpart European Patent Application No. 16878309.0, dated Jul. 22, 2019 (7 pages).
Lin, D. et al.; "Color Range Images Captured by a Four-Phase CMOS Image Sensor"; IEEE Transactions on Electron Devices, vol. 58, No. 3, Mar. 2011, pp. 732-739 (8 pages).
Office Action issued in corresponding Chinese Application No. 201680074554.3; dated Dec. 5, 2019 (14 pages).
Office Action issued in Chinese Application No. 201680075256.6, dated Jun. 22, 2021 (30 pages).
Office Action issued in corresponding Chinese Application No. 201680074579.3 dated Aug. 30, 2021 (18 pages).

\* cited by examiner

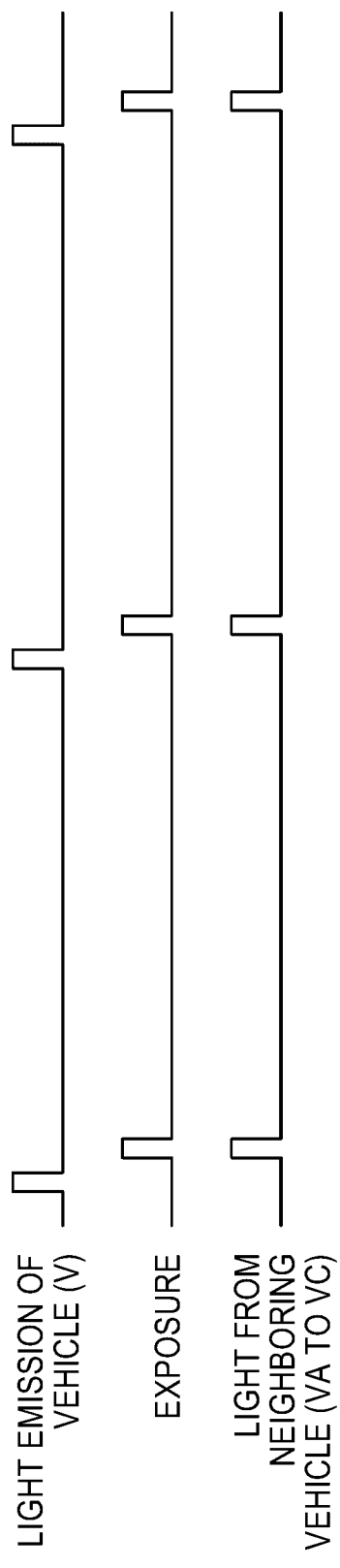

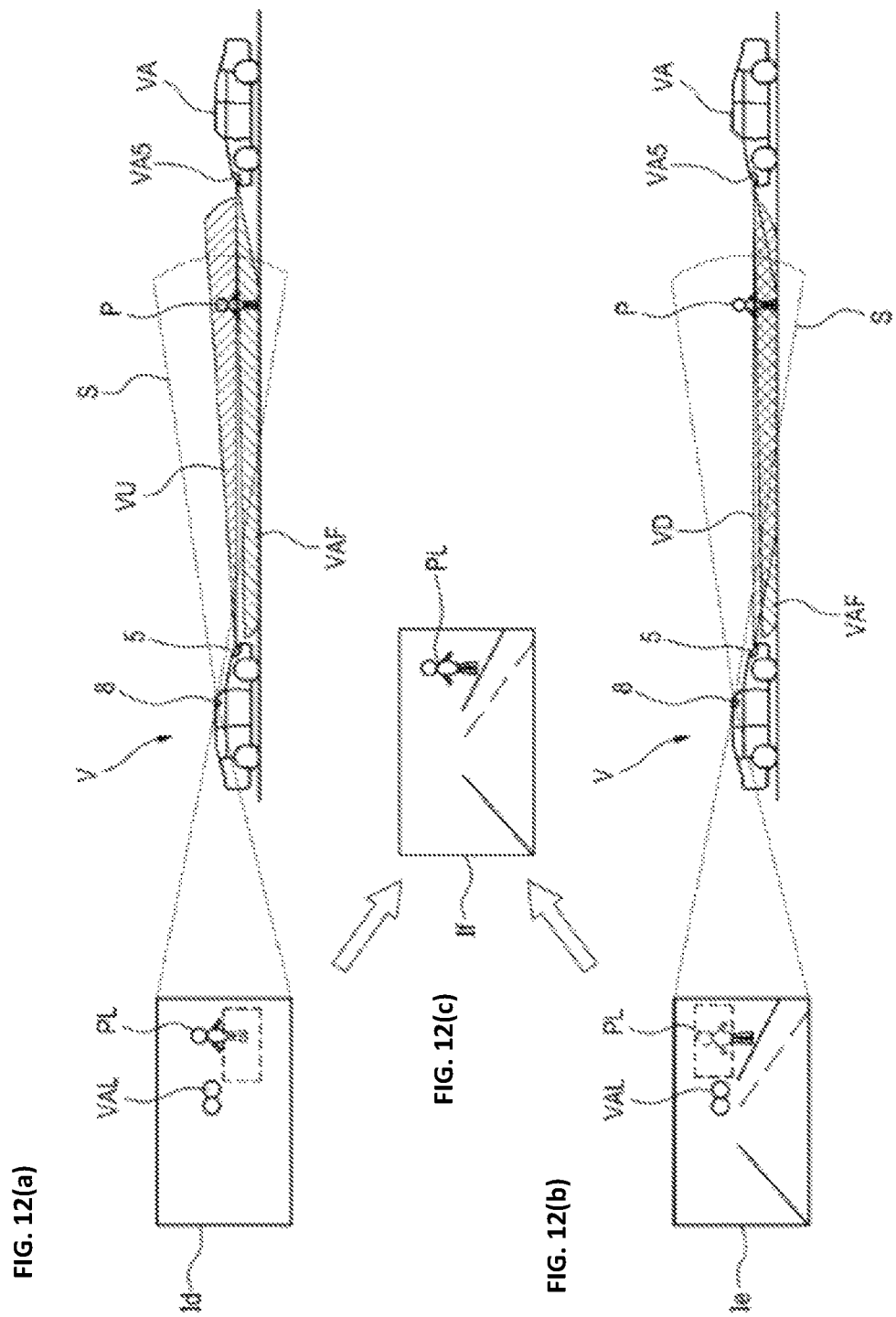

IMAGE ACQUIRING APPARATUS FOR VEHICLE, CONTROL DEVICE, VEHICLE HAVING IMAGE ACQUIRING APPARATUS FOR VEHICLE OR CONTROL DEVICE, AND IMAGE ACQUIRING METHOD FOR VEHICLE

CROSS-REFERENCE TO RELATED APPLICATIONS

This application claims priority to Japanese Patent Application No. 2015-248829 filed on Dec. 21, 2015, and Japanese Patent Application No. 2015-248830 filed on Dec. 21, 2015, the contents of which are incorporated herein by reference in their entirety.

BACKGROUND

Technical Field

This disclosure relates to an image acquiring apparatus for a vehicle, a control device, a vehicle having the image acquiring apparatus for a vehicle or the control device, and an image acquiring method for a vehicle.

Related Art

Patent Document 1 discloses a distance image data generating apparatus for a vehicle, which emits pulse light forward from a vehicle having the distance image data generating apparatus in a predetermined cycle and images reflected light from target distances at imaging timings set according to the target distances, thereby acquiring a plurality of different images of the target distances, and generates distance image data representing the distance to an object of each pixel, based on the luminance of the same pixel in the images.

Patent Document 1: JP-A-2009-257983

SUMMARY OF THE INVENTION

The distance image data generating apparatus for a vehicle disclosed in Patent Document 1 acquires an image of each predetermined target distance range by imaging reflected light of pulse light when a predetermined time elapses after light emission of pulse light from the vehicle. This apparatus accumulates electric charge for images by repeating light emission of pulse light and exposure many times and images the electric charge. Therefore, if the apparatus continuously and repeatedly images pulse light from a neighboring vehicle having the same system, or the reflected light thereof, it may generate erroneous distance image data.

Also, if the device images irregular reflected light from pedestrians, guardrails, and so on and pulse light emitted from neighboring vehicles, it may not be able to acquire accurate distance image data.

Accordingly, one or more embodiments of the present invention provides an image acquiring apparatus for a vehicle, a control device, a vehicle having the image acquiring apparatus for a vehicle or the control device, and an image acquiring method for a vehicle, capable of acquiring accurate distance information without being affected by light emission of pulse light from a neighboring vehicle and irregular reflected light.

An image acquiring apparatus for a vehicle according to one or more embodiments of the present invention includes: a light emitting unit configured to emit pulse light to a predetermined direction; an image acquisition unit configured to acquire a plurality of different images of target distance ranges by imaging reflected light returning from the target distance ranges at imaging timings set according to the target distance ranges; and a timing control unit configured to control a light emission cycle of the pulse light and the imaging timings, wherein the timing control unit is configured to control the light emission cycle and the imaging timings such that the light emission cycle and the imaging timings are modulated by random numbers.

According to the above-mentioned configuration, the image acquiring apparatus for a vehicle may be able to acquire accurate distance information without being affected by pulse light emission from a neighboring vehicle.

The timing control unit may be configured to modulate the light emission cycle and the imaging timings by adding a time generated randomly to each of a basic interval period of the light emission cycle and a basic interval period of the imaging timings.

According to the above-mentioned configuration, it may be possible to modulate the light emission cycle and imaging timings by a simple configuration.

The timing control unit may be configured to modulate the light emission cycle and the imaging timings by modulating a part of the basic interval period by random numbers for each of the target distance ranges.

According to the above-mentioned configuration, it may be possible to more surely prevent the effect of pulse light from a neighboring vehicle.

Also, an image acquiring apparatus for a vehicles according to one or more embodiments of the present invention includes: a light emitting unit configured to emit pulse light to a predetermined direction; an image acquisition unit configured to acquire a plurality of different images of target distance ranges by imaging reflected light returning from the target distance ranges at imaging timings set according to the target distance ranges; and a timing control unit configured to control a light emission cycle of the pulse light and the imaging timings, wherein the timing control unit is configured to control the light emission cycle and the imaging timings by communicating with a neighboring vehicle such that the light emission cycle and the imaging timings are not the same as a light emission cycle of pulse light which is emitted from the neighboring vehicle.

Also, an image acquiring apparatus for a vehicles according to one or more embodiments of the present invention includes: a light emitting unit configured to emit pulse light to a predetermined direction; an image acquisition unit configured to acquire a plurality of different images of target distance ranges by imaging reflected light returning from the target distance ranges at imaging timings set according to the target distance ranges; and a timing control unit configured to control a light emission cycle of the pulse light and the imaging timings, wherein the timing control unit is configured to control the light emission cycle and the imaging timings based on a direction and a location of the own vehicle.

According to these configurations, the image acquiring apparatus may be able to acquire accurate distance information without being affected by pulse light emission from a neighboring vehicle.

The direction of the own vehicle may be determined by a geometric sensor, and the location of the own vehicle may be determined based on GPS data.

According to the above-mentioned configuration, it may be possible to easily determine the direction and location of the vehicle, and suitably control the light emission cycle and imaging timings.

Also, a control device according to one or more embodiments of the present invention for controlling an image acquiring apparatus for a vehicle includes a light emitting unit configured to emit pulse light to a predetermined direction, and an image acquisition unit configured to acquire a plurality of different images of target distance ranges by imaging reflected light returning from the target distance ranges at imaging timings set according to the target distance ranges, and is configured to control a light emission cycle of the pulse light and the imaging timings such that the light emission cycle and the imaging timings are modulated by random numbers.

According to the above-mentioned configuration, the control device may be able to acquire accurate distance information without being affected by pulse light emission from a neighboring vehicle.

Also, an image acquiring method for a vehicle according to one or more embodiments of the present invention is an image acquiring method for a vehicle which acquires a plurality of different images of target distance ranges by imaging reflected light of pulse light emitted to a predetermined direction while changing imaging timings, and includes controlling a light emission cycle of the pulse light and the imaging timings such that the light emission cycle and the imaging timings are modulated by random numbers.

According to the above-mentioned method, it is possible to provide an image acquiring method for a vehicle capable of acquiring accurate distance information without being affected by pulse light emission from a neighboring vehicle.

An image acquiring apparatus for a vehicle according to one or more embodiments of the present invention includes: a light emitting unit configured to emit pulse light to a predetermined direction; an image acquisition unit configured to acquire a plurality of different images of target distance ranges by imaging reflected light returning from the target distance ranges at imaging timings set according to the target distance ranges; a timing control unit configured to control a light emission cycle of the pulse light and the imaging timings; and an image processing unit configured to perform image processing on the plurality of images acquired by the image acquisition unit, wherein the light emitting unit is configured to emit the pulse light toward a plurality of directions, wherein the timing control unit is configured to control the light emission cycle of pulse light and the imaging timings such that at a first timing, the pulse light is emitted toward a first direction of the plurality of directions and reflected light of the emitted pulse light is imaged, and at a second timing different from the first timing, the pulse light is emitted toward a second direction different from the first direction and reflected light of the emitted pulse light is imaged, and wherein the image processing unit is configured to compare a first image acquired at the first timing and a second image acquired at the second timing to determine whether light other than the reflected light is imaged, and generate a composite image of the first image and the second image in which light other than the reflected light is removed as noise if it is determined that light other than the reflected light is imaged.

According to the above-mentioned configuration, it may be possible to acquire accurate distance information without being affected by irregular reflected light and pulse light which is emitted from a neighboring vehicle.

The first direction may be a direction to a right area in front of an own vehicle having the image acquiring apparatus, and the second direction may be a direction to a left area in front of the own vehicle.

The first direction may be a direction to an upper area in front of the own vehicle, and the second direction may be a direction to a lower area in front of the own vehicle.

According to these configurations, for example, it may be possible to easily acquire accurate distance information.

Also, a control device according to one or more embodiments of the present invention for controlling an image acquiring apparatus for a vehicle includes a light emitting unit configured to emit pulse light to a plurality of directions, and an image acquisition unit configured to acquire a plurality of different images of target distance ranges by imaging reflected light returning from the target distance ranges at imaging timings set according to the target distance ranges, and includes: a timing control unit configured to control a light emission cycle of the pulse light and the imaging timings; and an image processing unit configured to perform image processing on the plurality of images acquired by the image acquisition unit, wherein the timing control unit is configured to control the light emission cycle of pulse light and the imaging timings such that at a first timing, the pulse light is emitted toward a first direction of the plurality of directions and reflected light of the emitted pulse light is imaged, and at a second timing different from the first timing, the pulse light is emitted toward a second direction different from the first direction and reflected light of the emitted pulse light is imaged, and wherein the image processing unit is configured to compare a first image acquired at the first timing and a second image acquired at the second timing to determine whether light other than the reflected light is imaged, and generate a composite image of the first image and the second image in which light other than the reflected light is removed as noise if it is determined that light other than the reflected light is imaged.

According to the above-mentioned configuration, it may be possible to acquire accurate distance information without being affected by irregular reflected light and pulse light which is emitted from a neighboring vehicle.

Also, an image acquiring method for a vehicle according to one or more embodiments of the present invention is an image acquiring method for a vehicle which acquires a plurality of different images of target distance ranges by imaging reflected light of pulse light emitted to predetermined directions while changing imaging timings and includes: a first imaging step of emitting the pulse light toward a first direction which is one of the predetermined directions and imaging reflected light of the pulse light at a first timing; a second imaging step of emitting the pulse light toward a second direction different from the first direction and imaging reflected light of the pulse light at a second timing different from the first timing; and an image composing step of comparing a first image acquired in the first imaging step and a second image acquired in the second imaging step to determine whether light other than the reflected light is imaged and generating a composite image of the first image and the second image by removing light other than the reflected light as noise if it is determined that light other than reflected light is imaged.

According to the above-mentioned method, it is possible to acquire accurate distance information without being affected by irregular reflected light and pulse light which is emitted from a neighboring vehicle.

Also, a vehicle according to one or more embodiments of the present invention includes the image acquiring apparatus described above or the control devices described above.

According to the above-mentioned configuration, it may be possible to improve safety of a vehicle having, for example, a self-driving system.

According to one or more embodiments in this disclosure, it is possible to provide an image acquiring apparatus for a vehicle, a control device, a vehicle having the image acquiring apparatus for a vehicle or the control device, and an image acquiring method for a vehicle, capable of acquiring accurate distance information without being affected by light emission of pulse light from a neighboring vehicle and irregular reflected light.

BRIEF DESCRIPTION OF DRAWINGS

FIG. 6B is a timing chart illustrating the relationship between the light emission cycle and imaging timings (exposure cycle) of the own vehicle and the light emission cycle of the neighboring vehicles.

FIGS. 12(a)-12(c) are schematic diagrams illustrating the irradiation ranges of light from lamps of an own vehicle according to a third example, the imaging range of a camera of the own vehicle, the irradiation range of light from an oncoming vehicle, and images which are acquired by the camera of the own vehicle.

DETAILED DESCRIPTION

Hereinafter, embodiments of the present invention will be described in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
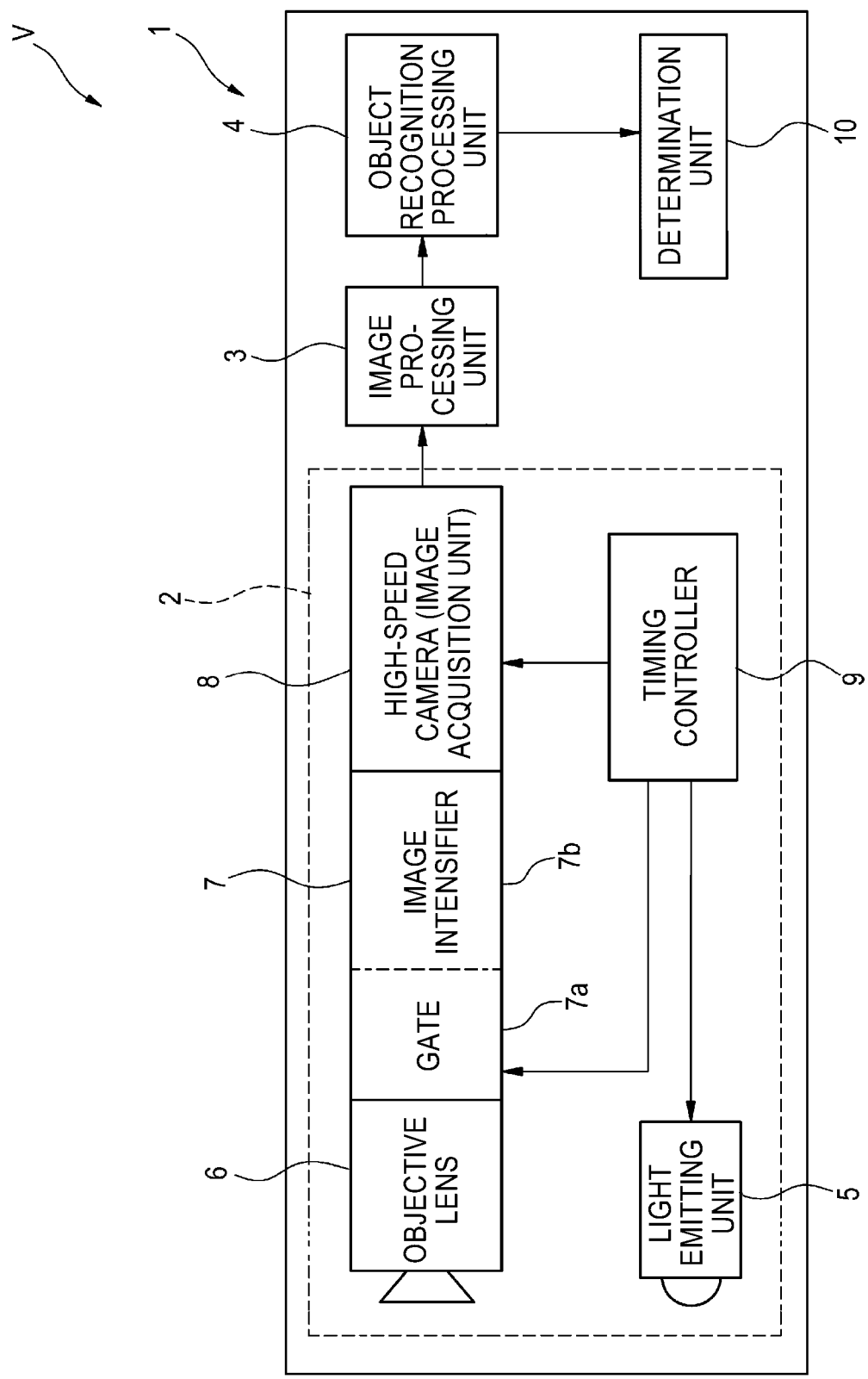
FIG. 1 is a block diagram illustrating the configuration of an obstacle detecting apparatus according to one or more embodiments of the present invention.
Figure 2:
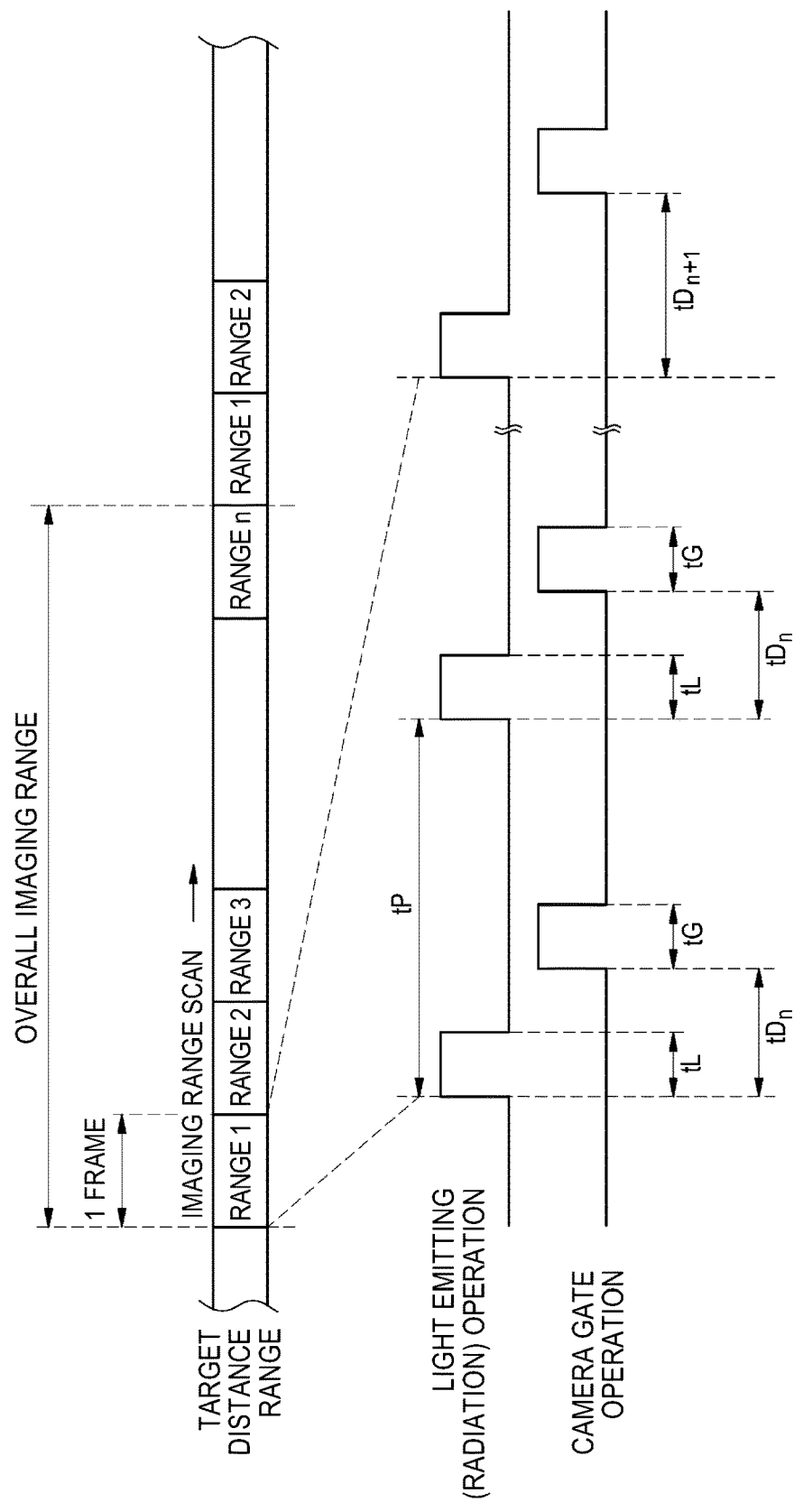
FIG. 2 is a view illustrating the temporal relationship between an operation (light emitting operation) of light emitting unit and an operation (camera gate operation) of a gate when imaging target distance ranges.

FIG. 1 is a block diagram illustrating the configuration of an obstacle detecting apparatus according to one or more embodiments of the present invention using an image acquiring apparatus for a vehicle. FIG. 2 is a schematic diagram illustrating the temporal relationship between an operation (light emitting operation) of light emitting unit and an operation (camera gate operation) of a gate when imaging respective target distance ranges.

As shown in FIG. 1, an obstacle detecting apparatus 1 which is installed in a vehicle V (the own vehicle) includes an image acquiring apparatus 2, an image processing unit (a distance image data generating unit) 3, an object recognition processing unit 4, and a determination unit 10.

The image acquiring apparatus 2 includes a light emitting unit 5, an objective lens 6, a light intensifying unit 7, a high-speed camera (an image acquisition unit) 8, and a timing controller (a timing control unit) 9.

The light emitting unit 5 is, for example, a near-infrared LED arranged at a front end part of the vehicle V. As shown in FIG. 2, the light emitting unit 5 emits pulse light to a predetermined direction (for example, forward from the vehicle V) for a predetermined light emission period tL (for example, 5 ns), according to a pulse signal output from the timing controller 9. The light emission cycle tP of pulse light which is radiated from the light emitting unit 5 is set to, for example, an interval of 10 μs or less.

The objective lens 6 is, for example, an optical system set so as to have such an angle of field that it is possible to image a predetermined range in front of the vehicle V, and receives reflected light from objects. The objective lens 6 may be disposed close to the light emitting unit 5, or may be disposed apart from the light emitting unit.

The light intensifying unit 7 includes a gate 7a and an image intensifier 7b

The gate 7a is opened and closed according to an opening/closing command signal from the timing controller 9. In one or more embodiments of the present invention, a period (gate period) tG when the gate 7a is opened is set to 5 ns similarly to the light emission period tL. The gate period tG is proportional to the imaging object length (imaging object depth) of each range (target distance range) of an overall imaging range from a range 1 to a range n. As the gate period tG is lengthened, the imaging object length of each range lengthens. The imaging object length is obtained from the product of light speed and the gate period tG, and in one or more embodiments of the present invention, since the gate period tG is set to 5 ns, the imaging object length becomes 1.5 m from the product of light speed (about $3 \times 10^8$ m/s) and the gate period (5 ns).

The image intensifier 7b is a device for first converting very weak light (such as reflected light from objects) into electrons, and electrically amplifying them, and converting them back into a fluorescent image, thereby doubling the amount of light, such that it is possible to see an image with clear contrast. Light amplified by the image intensifier 7b is guided to an image sensor of the high-speed camera 8.

The high-speed camera 8 images the image output from the light intensifying unit 7, according to a command signal from the timing controller 9, and outputs the acquired image to the image processing unit 3. In one or more embodiments of the present invention, a camera having a resolution of 640×480 (transverse: longitudinal), luminance values 1 to 255 (256 levels), and a frame rate of 100 fps or more is used.

The timing controller 9 controls imaging timings by setting a delay time tD (in FIG. 2, $tD_n$, $tD_{n+1}$) which is a time from when the light emitting unit 5 start to emit light to when the gate 7a is opened such that the timings when images are acquired by the high-speed camera 8 become the timings when reflected light from target distance ranges which are target imaging ranges reach, and outputting opening/closing command signals according to the delay time tD. In other words, the delay time tD is a value to determine the distance (imaging object distance) from the vehicle V to each target distance range. The relationship between the delay time tD and the imaging object distance is obtained from the following Expression (1).

$$\text{Imaging Object Distance} = \text{Light Speed (about } 3 \times 10^8 \text{ m/s)} \times \text{Delay Time } tD/2 \quad (1)$$

The timing controller 9 changes the imaging range of the high-speed camera 8 forward from the vehicle V by repeatedly lengthening the delay time tD by a predetermined interval (for example, 10 ns) such that the target distance range continuously goes forward (away) from the vehicle V. Also, the timing controller 9 performs control such that the imaging operation of the high-speed camera 8 starts immediately before the gate 7a is opened and the imaging operation finishes after the gate 7a is completely closed.

The timing controller 9 controls the light emitting unit 5, the gate 7a, and the high-speed camera 8 such that they perform a plurality of times of light emission and exposure for each of preset target distance ranges (each range of the range 1, the range 2, ... , and the range n). Light which the high-speed camera 8 has received is converted into electric charge, and a plurality of times of light emission and exposure is repeated, whereby the electric charge is accumulated. One image which is acquired in every predetermined charge accumulation period is called a frame. However, the high-speed camera 8 may acquire one image (one frame) with respect to each target distance range, or may acquire a plurality of images (several frames) with respect to each target distance range. In the above-mentioned way, the high-speed camera 8 acquires a plurality of different images of target distance ranges, and outputs the plurality of acquired images to the image processing unit 3.

The image processing unit 3 generates distance image data representing the distances to objects (subjects) of respective pixels, based on the luminance of the same pixels in all images acquired by the high-speed camera 8, and outputs the generated distance image data to the object recognition processing unit 4.

The object recognition processing unit 4 specifies objects included in the distance image data. As the object specifying method, a well-known technology such as pattern mapping can be used.

The determination unit 10 determines the relationship (such as distances and directions) between the vehicle (the vehicle V) and the objects (such as persons, automobiles, and signs) specified by the object recognition processing unit 4.

Next, an image acquiring operation according to one or more embodiments of the present invention will be described.

Image Acquiring Operation

The timing controller 9 sets the delay time tD such that the timings when an image which is acquired by the high-speed camera 8 becomes the timing when reflected light from predetermined target distance ranges reaches, thereby controlling imaging timings of the high-speed camera 8. In the case where there is any object in a target distance range, the time required for light emitted from the light emitting unit 5 to return from the target distance range becomes the time required for the light to travel out and back over the distance (imaging object distance) between the vehicle V and the target distance range. Therefore, the delay time tD can be obtained from the imaging object distance and the light speed.

In an image of the high-speed camera 8 acquired by the above-mentioned method, in the case where there is an object in a target distance range, luminance value data of pixels corresponding to the location of the corresponding object and affected by the reflected light represent values higher than luminance value data of the other pixels. Therefore, it is possible to obtain the distance to the object existing in the target distance range, based on the luminance value data of the respective pixels.

Figure 3:
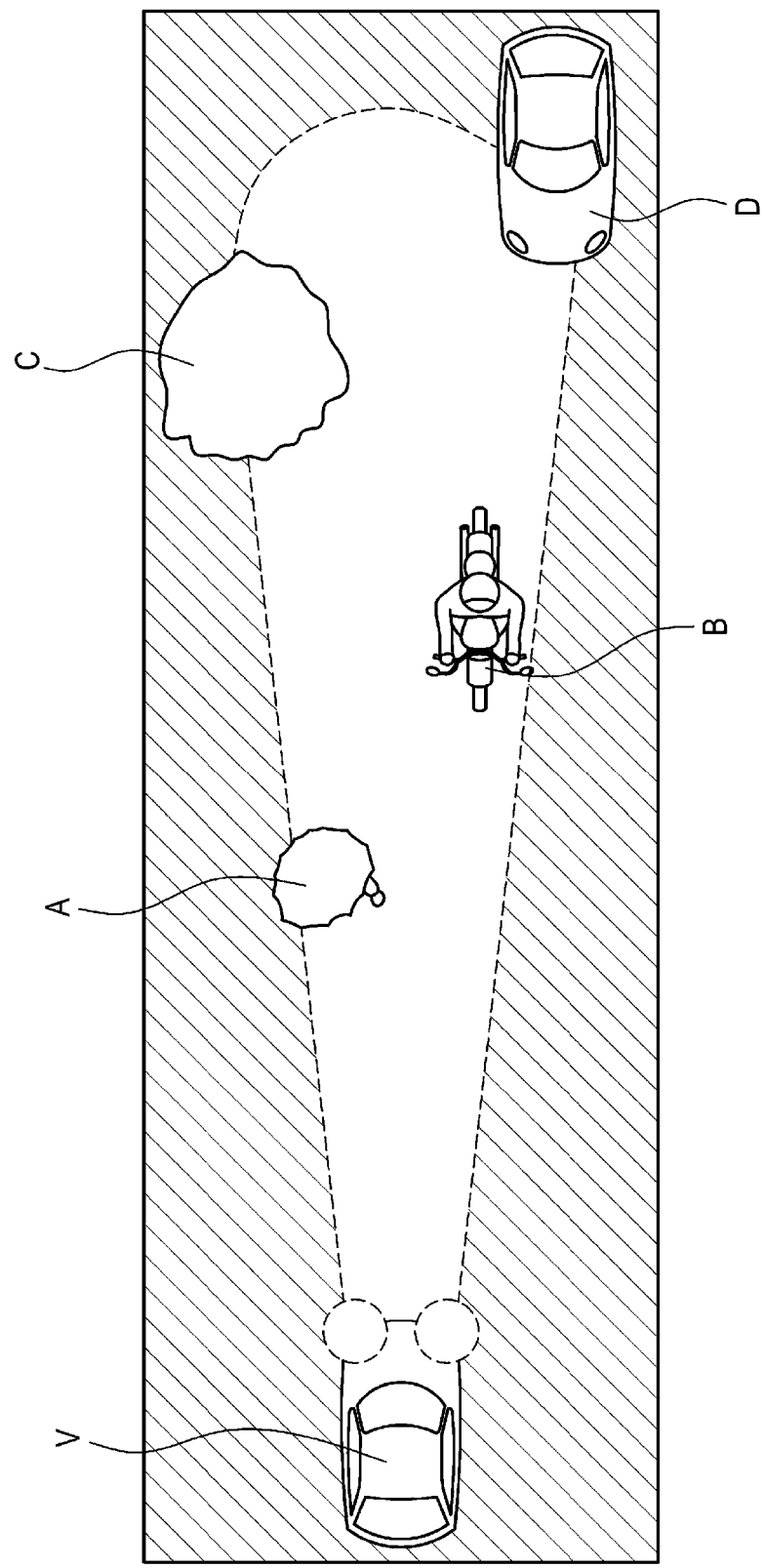
FIG. 3 is a view illustrating a situation where four different objects exist at different positions in front of the own vehicle.

FIG. 3 shows a situation where four objects A to D exist at different locations in front of the vehicle V. The object A is a person holding an umbrella, and the object B is a motorcycle on the oncoming lane side, and the object C is a tree on the walkway side, and the object D is a vehicle (an oncoming vehicle) on the oncoming lane side. It is assumed that the relationship of the distances between the vehicle V and the respective objects is A<B<C<D.

Figure 4:
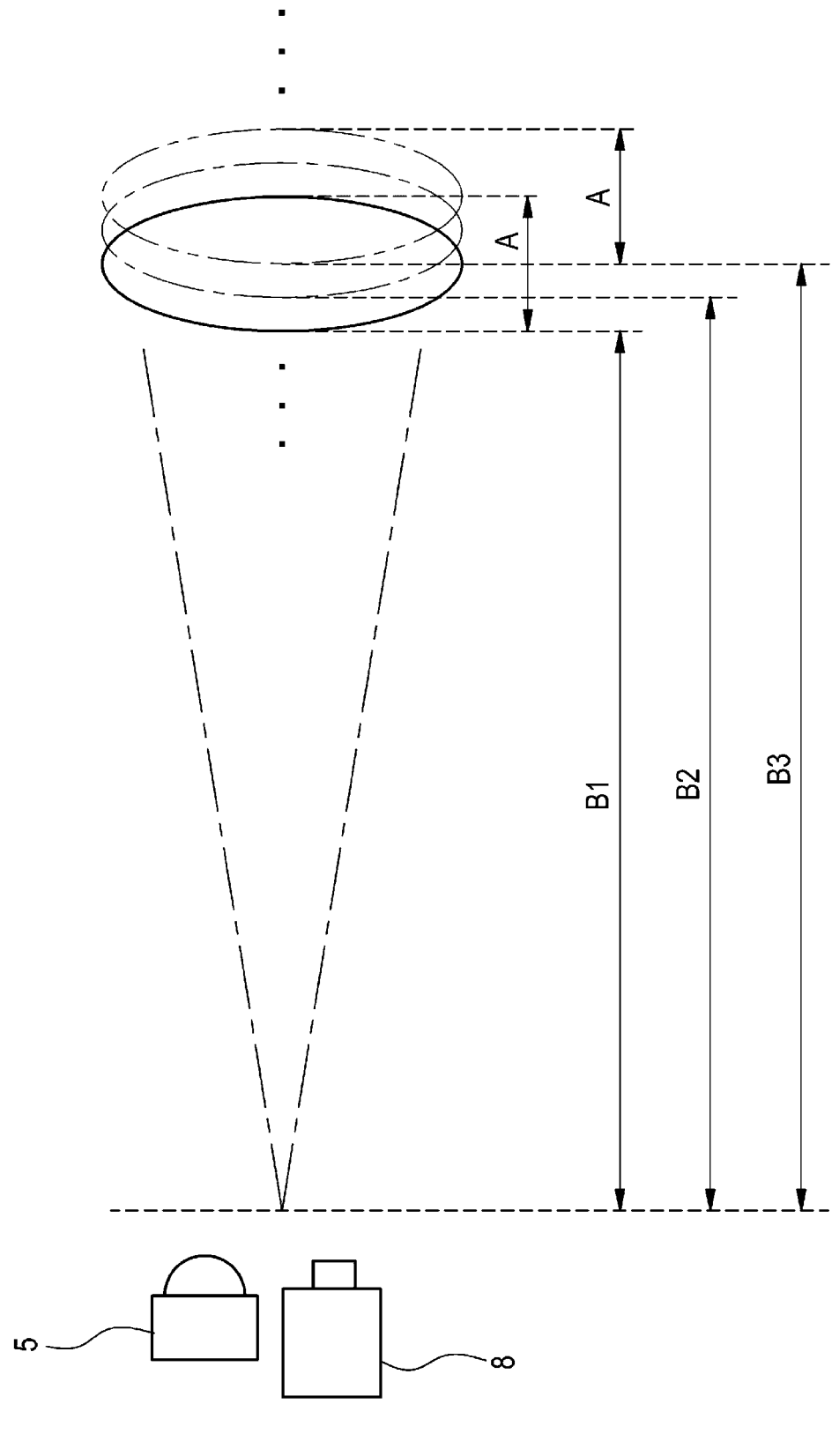
FIG. 4 is a view illustrating a state where imaging ranges partially overlap.

In this case, in one or more embodiments of the present invention, imaging ranges are partially overlapped such that reflected light from one object is reflected in pixels of images of a plurality of continuous imaging ranges. In other words, as shown in FIG. 4, in the case of acquiring images while continuously changing the imaging object distance in the order of B1, B2, B3, ... , by setting the increment (B2−B1) in the imaging object distance, shorter than the imaging object length A of each imaging range, the increment in the imaging object distance is set such that imaging ranges change while partially overlapping.

Figure 5:
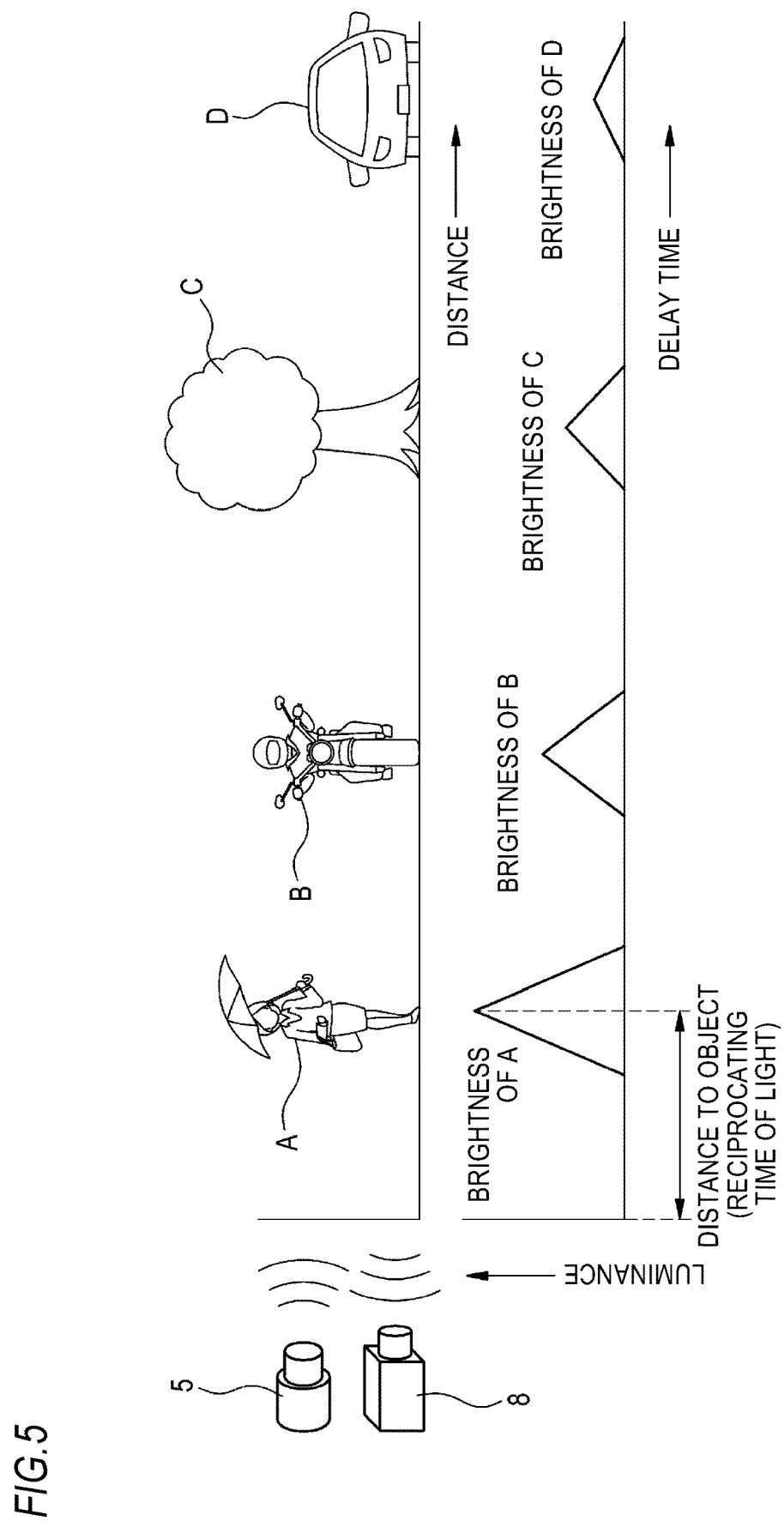
FIG. 5 is a schematic diagram illustrating temporal luminance variations in pixels corresponding to the respective objects.

FIG. 5 shows temporal luminance variations in pixels corresponding to the respective objects.

Since the imaging ranges are partially overlapped, as shown in FIG. 5, the luminance values of the same pixels in the plurality of consecutive images represent features having triangular wave shapes in which the luminance values gradually increase and have peaks at the positions of the respective objects A to D and gradually decrease. That is, since the increment is set such that reflected light from one object is reflected in a plurality of images, the temporal luminance variations in the pixels have the triangular wave shapes. Therefore, if imaging ranges corresponding to the peaks of the triangular wave shapes are set at the distances from the vehicle V to the respective objects (subjects) A to D of the pixels, it is possible to improve detection accuracy.

Also, the obstacle detecting apparatus 1 having the image acquiring apparatus 2 according to one or more of the above-described embodiments can be used for light distribution control of a so-called AHB (automatic high beam) system and an ADB (adaptive driving beam) system. By using the obstacle detecting apparatus 1 together with another camera sensor mounted on the vehicle V, for example, existence or non-existence of objects in front of the vehicle V and the distances to objects are detected from a plurality of different images of target distance ranges acquired by the image acquiring apparatus 2, and an image of an area in front of the vehicle V is acquired by the another camera sensor. It is possible to obtain the distance of each light spot in the image acquired by the camera sensor from the images acquired by the image acquiring apparatus 2, and from the distance, the luminance, shape (the shape of the light spot and the periphery thereof), time-series variation, and so on of each light spot, it is possible to determine whether the light spot corresponds to a vehicle. That is, by using the image acquiring apparatus 2 and another camera sensor together, it is possible to perform detection of objects, distant vehicles, with high accuracy at high speed, and it is possible to suitably perform light distribution control of an AHB system or an ADB system.

First Example

Figure 6A:
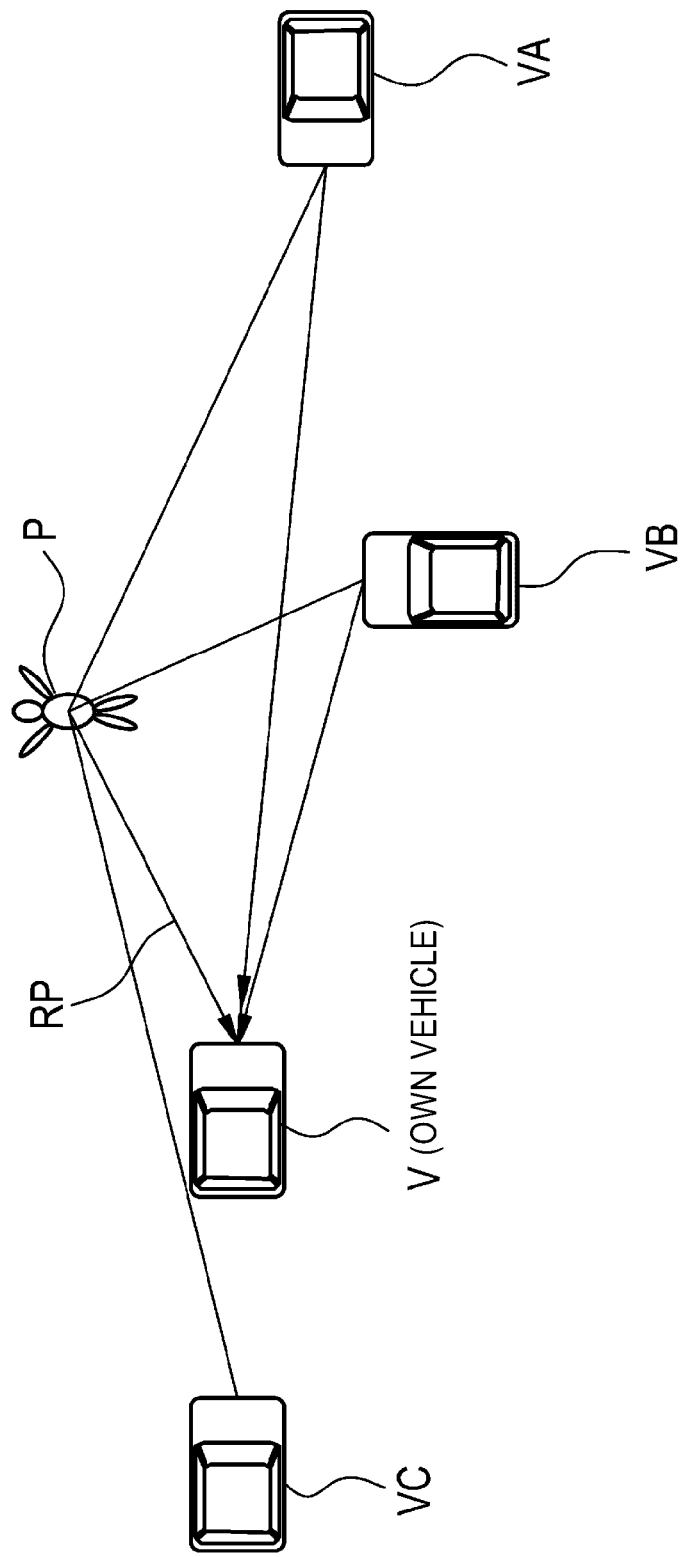
FIG. 6A is a view illustrating examples of light paths of light which is emitted from the own vehicle and light which is emitted from neighboring vehicles, and light paths of the reflected light of the emitted light.

FIG. 6A is a view illustrating examples of light paths of light which is emitted from the own vehicle and light which is emitted from neighboring vehicles, and light paths of the reflected light of the emitted light. FIG. 6B is a timing chart illustrating the relationship between the light emission cycle and imaging timings (exposure cycle) of the own vehicle and the light emission cycle of the neighboring vehicles.

As shown in FIG. 6A, in front of the vehicle V (the own vehicle), there are a pedestrian P on the left walkway, an oncoming vehicle VA in the opposing lane, and a lateral vehicle VB coming from the right side. Also, behind the vehicle V, there is a following vehicle VC. If the neighboring vehicles VA to VC have image acquiring systems similar to that of the vehicle V, pulse light emitted from the neighboring vehicles VA and VB, and reflected light which is light emitted from the neighboring vehicles VA to VC and reflected from, for example, the pedestrian P enter from the objective lens 6 of the vehicle V. In this case, as shown in FIG. 6B, if light emission from the neighboring vehicles is performed at the same timings as the timings of exposure operations (opening operations of the gate 7a) of the vehicle V, the high-speed camera 8 of the vehicle V continuously and repeatedly images not only light emitted from the light emitting unit 5 but also light emitted from the neighboring vehicles VA to VC. When acquiring images, the high-speed camera accumulates electric charge in the image sensor by repeating light emission and exposure many times, and images the electric charge. Therefore, if the high-speed camera is repeatedly exposed to light emitted from the neighboring vehicles VA to VC, errors may be in the luminance value data of pixels of acquired images, and it may not be possible to acquire accurate distance information.

For this reason, from a comprehensive perspective on the above-described circumstances, the inventors of this application have found a method capable of acquiring accurate distance information without being affected by light emission of pulse light of a neighboring vehicle. Hereinafter, as a method for acquiring accurate distance information, a first example will be described in detail.

Figure 7:
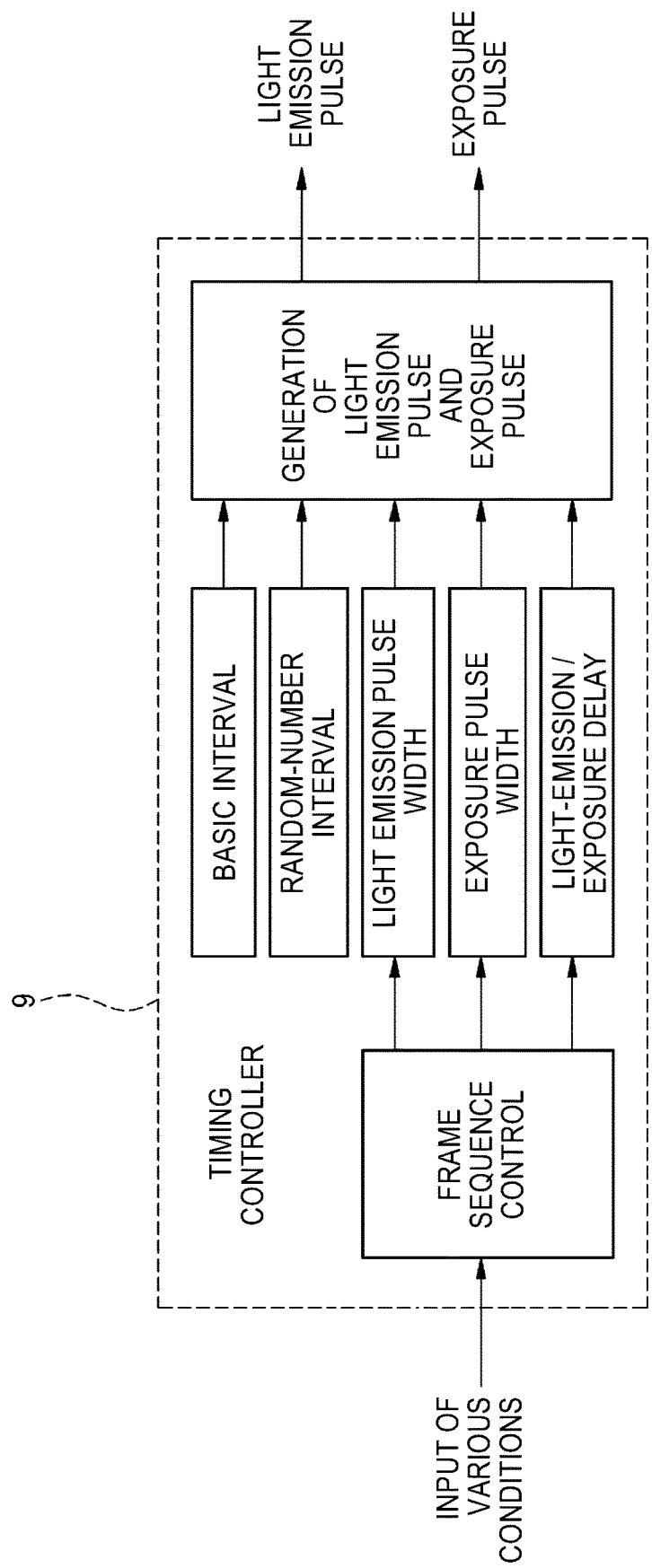
FIG. 7 is a control block diagram of a timing control unit according to a first example.
Figure 8:
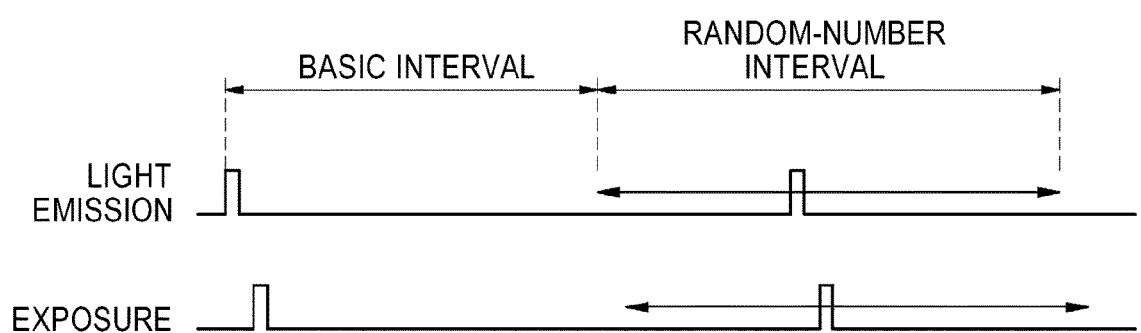
FIG. 8 is a view illustrating modulation control on a light emission cycle and imaging timings according to the first example.
Figure 9:
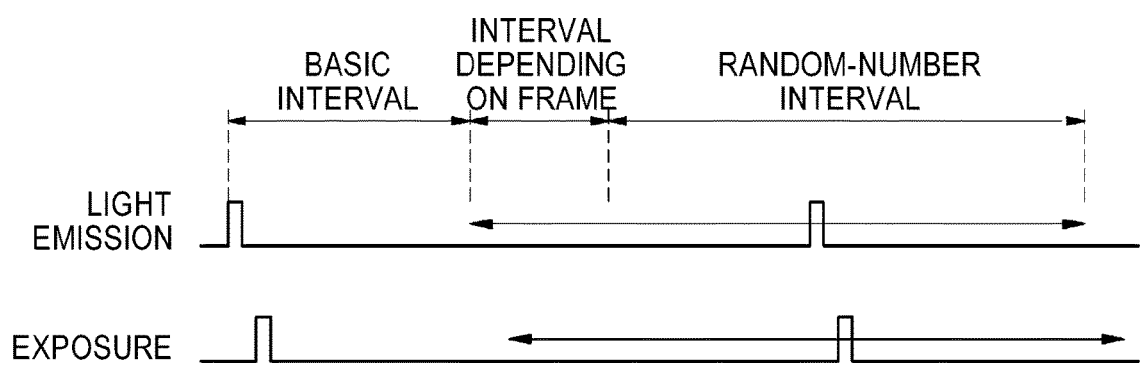
FIG. 9 is a view illustrating modulation control according to another example of the first example.

FIG. 7 is a control block diagram of the timing controller 9 according to the example. FIG. 8 is a view illustrating modulation control on a light emission cycle and imaging timings according to the example. FIG. 9 is a view illustrating modulation control according to another example of the example.

In FIG. 7, first, various conditions such as desired target distance ranges are input. Then, the timing controller 9 performs frame sequence control. In the frame sequence control, for each of target distance ranges (ranges 1 to n), a light emission pulse width, an exposure pulse width, and a light-emission/exposure delay value to determine the light emission period tL of pulse light, the gate period tG, and the delay time tD shown in FIG. 2 are respectively set. Also, the timing controller 9 sets a basic interval period which is a constant time of an interval period which is the light emission cycle tP of pulse light (a time from a pulse light emission start time point to the next pulse light emission start time point), and a random-number interval period. Similarly, with respect to the opening/closing cycle of the gate 7a (imaging timings), the timing controller sets a basic interval period which is a constant time and a random-number interval period, in sync with the light emission cycle of pulse light. The random-number interval period is a time which can be changed randomly, for example, according to random numbers which are generated by a random number generator circuit. The random number generator circuit may be installed in the timing controller 9, or in an ECU installed in the vehicle and capable of communication with the timing controller 9.

The timing controller 9 generates a light emission pulse signal and an exposure pulse signal from the light emission pulse width, the exposure pulse width, the light-emission/exposure delay value, the basic interval periods, and the random-number interval periods set as described above. The timing controller 9 outputs the generated light emission pulse signal to the light emitting unit 5 while outputting the generated exposure pulse signal to the gate 7a (and the high-speed camera 8). Based on the light emission pulse signal, the light emitting unit 5 emits pulse light with predetermined light emission periods tL in the light emission cycle tP, forward from the vehicle. Also, based on the exposure pulse signal, the gate 7a performs opening/closing operations with predetermined gate periods tG at the predetermined imaging timings (in the same cycle as the light emission cycle tP).

In this case, in one or more embodiments of the present invention, as shown in FIG. 8, the light emission cycle tP of pulse light and imaging timings sync with the light emission cycle tP are determined based on times obtained by adding random-number interval periods to the basic interval periods. In this way, the light emission cycle tP of the light emitting unit 5 and the gate opening/closing cycle of the gate 7a (imaging timings) are modulated randomly by random numbers.

According to the image acquiring apparatus 2 of the example described above, one or more of the following effects may be obtained.

(1) The timing controller 9 controls the light emission cycle tP of the light emitting unit 5 and imaging timings such that the light emission cycle tP and the gate opening/closing cycle of the gate 7a (imaging timings) are modulated by random numbers. According to this configuration, even though the neighboring vehicles VA to VC have image acquiring systems similar to that of the vehicle V, it is possible to prevent the camera 8 from being continuously and repeatedly exposed to light emitted from the neighboring vehicles VA to VC. Therefore, the image acquiring apparatus 2 can acquire accurate distance information without being affected by pulse light emission from the neighboring vehicles VA to VC.

(2) The timing controller 9 is configured to modulate the light emission cycle tP and imaging timings by adding a random-number interval period generated randomly to each of the basic interval period of the light emission cycle tP and the basic interval period of imaging timings. According to this configuration, it is possible to modulate the light emission cycle tP and imaging timings by a simple configuration.

Also, as shown in FIG. 9, the timing controller 9 may be configured to control the light emission cycle tP by setting a part of the basic interval period of the light emission cycle tP to an interval period depending on each target distance range (frame) and adding a random-number interval period thereto. In other words, in the example shown in FIG. 9, a part of the basic interval period is changed to an interval period depending on each frame, whereby basic interval periods for imaging respective ranges become different times. If random-number interval periods are added to different basic interval periods depending on frames, it is possible to more surely prevent the influence of pulse light emitted from the neighboring vehicles VA to VC.

Second Example

Next, a second example will be described with reference to FIG. 10 and FIGS. 11(a)-11(c).

Figure 10:
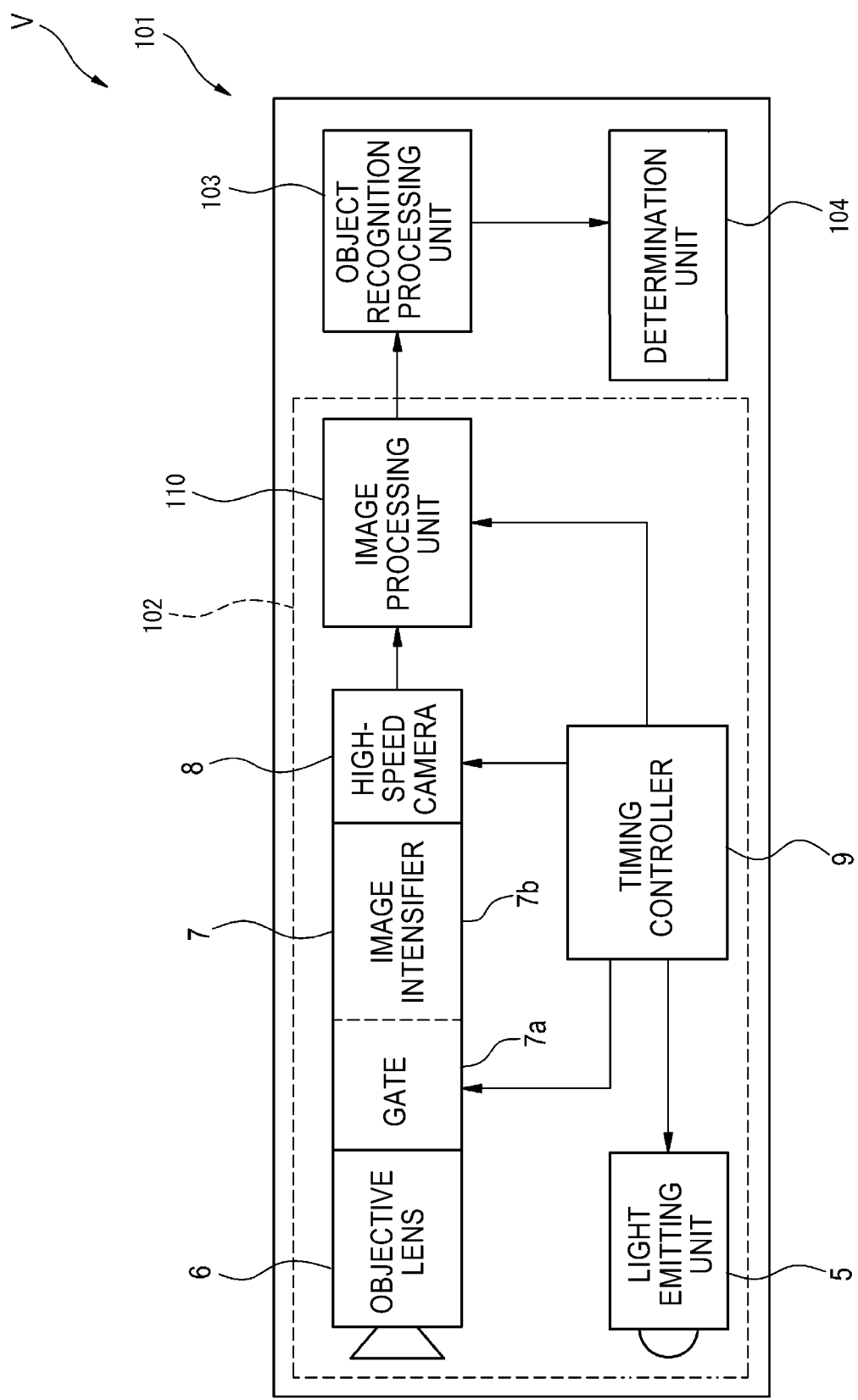
FIG. 10 is a block diagram illustrating the configuration of an obstacle detecting apparatus according to a second example.

As shown in FIG. 10, an obstacle detecting apparatus 101 which is installed in a vehicle V (the own vehicle) includes an image acquiring apparatus 102, an object recognition processing unit 103, and a determination unit 104.

The image acquiring apparatus 102 includes a light emitting unit 5, an objective lens 6, a light intensifying unit 7, a high-speed camera (an image acquisition unit) 8, a timing controller (a timing control unit) 9, an image processing unit 110.

The image processing unit 110 generates distance image data representing the distances to objects (subjects) of respective pixels, based on the luminance of the same pixels in images of all imaging ranges acquired by the high-speed camera 8, and outputs the generated distance image data to the object recognition processing unit 103.

The object recognition processing unit 103 specifies objects included in the distance image data. As the object specifying method, a well-known technology such as pattern mapping can be used.

The determination unit 104 determines the relationship (such as distances and directions) between the vehicle (the vehicle V) and the objects (such as persons, automobiles, and signs) specified by the object recognition processing unit 103.

As shown in FIG. 6A of the first example, in front of the vehicle V (the own vehicle), there are a pedestrian P on the left walkway, an oncoming vehicle VA in the opposing lane, and a lateral vehicle VB coming from the right side. Also, behind the vehicle V, there is a following vehicle VC. If the neighboring vehicles VA to VC have distance image data generating systems similar to that of the vehicle V, pulse light emitted from the neighboring vehicles VA and VB, and irregular reflected light which is light emitted from the neighboring vehicles VA to VC and reflected from, for example, the pedestrian P enter from the objective lens 6 of the vehicle V. As such irregular reflected light, beside reflected light RP which is light emitted from the neighboring vehicles VA to VC and reflected from the pedestrian P and is shown in FIG. 6A, for example, light emitted from the neighboring vehicles VA to VC and reflected from structures such as guardrails (particularly, delineators (reflectors) attached to guardrails) near the road is included. In one or more embodiments of the present invention, the obstacle detecting apparatus emits pulse light from the light emitting unit 5 of the vehicle V which is the own vehicle, and acquires images of the ranges 1 to n while changing the delay time tD, and compares the luminance value data of the same pixels in the respective images, and detects the highest luminance value data as the distances of the corresponding pixels. Therefore, if irregular reflected light is included in images, errors may be in the luminance value data of the respective pixels of the images, and it may not be possible to acquire accurate distance information.

Also, as described above, if the light emission cycles of the neighboring vehicles are the same as the exposure cycle of the vehicle V (the opening cycle of the gate 7a) as shown in FIG. 6B, since the high-speed camera 8 of the vehicle V is continuously and repeatedly exposed not only to light emitted from the light emitting unit 5 but also to light emitted from the neighboring vehicles VA to VC, it is likely that distance information cannot be accurately acquired.

For this reason, from a comprehensive perspective on the above-described circumstances, the inventors of this application have found a method capable of acquiring accurate distance information without being affected by irregular reflected light and pulse light emitted from a neighboring vehicle. Hereinafter, as a method for acquiring accurate distance information, a second example will be described in detail.

Figure 11A:
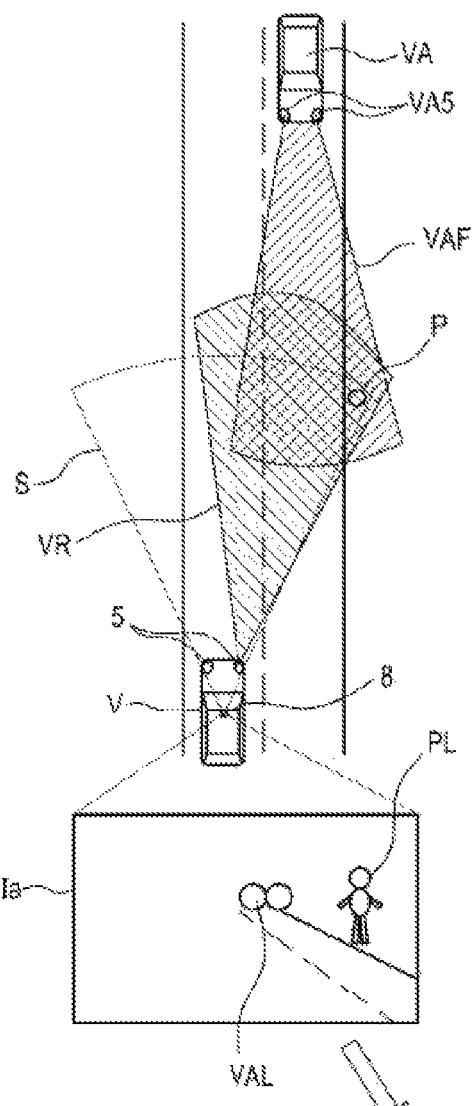
FIGS. 11(a)-11(c) are schematic diagrams illustrating the irradiation ranges of light from lamps of an own vehicle according to the second example, the imaging range of a camera of the own vehicle, the irradiation range of light from an oncoming vehicle, and images which are acquired by the camera of the own vehicle.
Figure 11B:
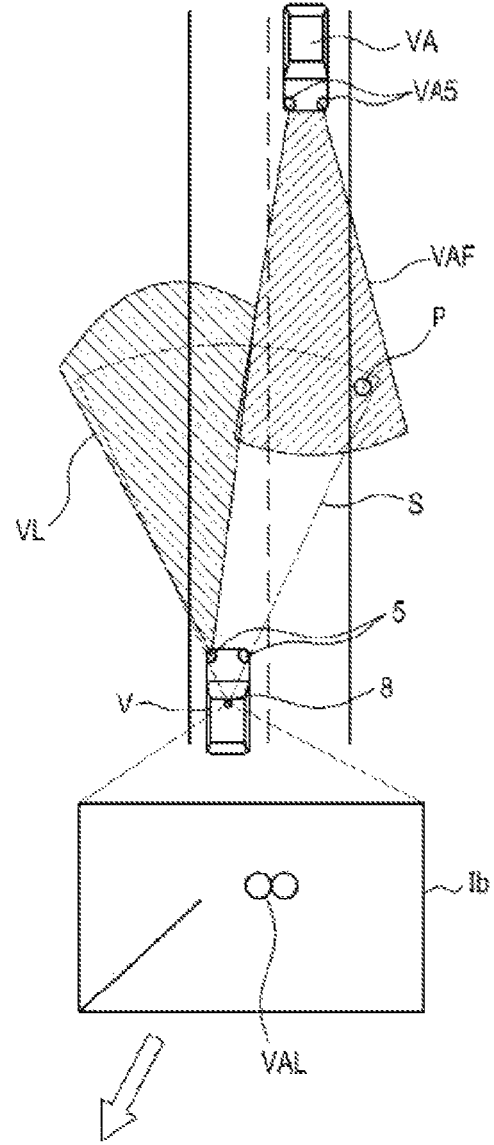
Figure 11C:
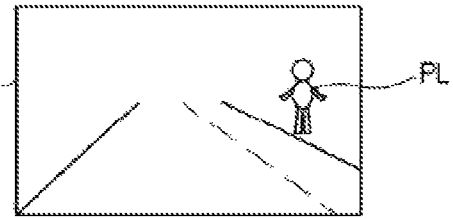

FIGS. 11(a) and 11(b) are schematic diagrams illustrating the irradiation area of light from the light emitting unit 5 of the vehicle V according to the second example, the imaging area of the high-speed camera 8 of the vehicle V, the irradiation area of light from the light emitting unit of the oncoming vehicle VA, and images acquired by the high-speed camera 8 of the vehicle V. Also, FIG. 11(c) shows an image obtained by removing noise from the acquired images shown in FIGS. 11(a) and 11(b) and combining the images.

FIG. 11(a) shows an irradiation area VR of pulse light which is emitted from the light emitting unit 5 of the vehicle V at a first timing, the imaging area S of the high-speed camera 8 of the vehicle V, an irradiation area VAF of light which is emitted from the light emitting unit of the oncoming vehicle VA, and the pedestrian P on the walkway on the right side as seen from the vehicle V. FIG. 11(b) shows an irradiation area VL of pulse light which is emitted from the light emitting unit 5 of the vehicle V at a second timing different from the first timing, the imaging area S of the high-speed camera 8 of the vehicle V, an irradiation area VAR of light which is emitted from the light emitting unit of the oncoming vehicle VA, and the pedestrian P on the right walkway.

As shown in FIGS. 11(a) and 11(b), the light emitting unit 5 can emit pulse light to a plurality of directions of the area in front of the vehicle, for example, toward the right side (a first direction) and left side (a second direction) in front of the vehicle, shown by the irradiation area VR and the irradiation area VL, at different timings, respectively. In order to make it possible to emit pulse light toward each of the left side and right side in front of the vehicle, for example, the light emitting unit 5 are mounted in the left and right head lamps of the vehicle V, respectively, and are configured such that the light emitting unit 5 mounted in the right head lamp irradiates the irradiation area VR and the light emitting unit 5 mounted in the left head lamp irradiates the irradiation area VL. Alternatively, instead of the light emitting unit 5, a single light emitting unit capable of switching between the irradiation areas may be provided on the front end part of the vehicle V and switch between the irradiation areas VR and VL of pulse light from the single light emitting unit at the first and second timings.

The imaging area S of the high-speed camera 8 of the vehicle V includes areas of the irradiation areas VR and VL of the light emitting unit 5, included in an area in front of the vehicle V. Also, a part of the irradiation area VAF from light emitting unit VA5 (left and right head lamps) of the oncoming vehicle VA overlaps the imaging area S of the high-speed camera 8 of the vehicle V.

The timing controller 9 outputs a pulse signal to the light emitting unit 5 such that pulse light is emitted toward the right side (the irradiation area VR) in front of the vehicle at the first timing shown in FIG. 11(*a*). In this case, the timing controller 9 outputs an opening/closing command signal to the gate 7*a* while outputting a command signal to the high-speed camera 8 such that the high-speed camera images the reflected light of the pulse light radiated to the irradiation area VR at the first timing (a first imaging step). Subsequently, the timing controller 9 outputs a pulse signal to the light emitting unit 5 such that pulse light is emitted toward the left side (the irradiation area VL) at the second timing shown in FIG. 11(*b*). In this case, the timing controller 9 outputs an opening/closing command signal to the gate 7*a* while outputting a command signal to the high-speed camera 8 such that the high-speed camera images the reflected light of the pulse light radiated to the irradiation area VL at the second timing (a second imaging step).

As described above, the timing controller 9 controls the operations of the light emitting unit 5, the gate 7*a*, and the high-speed camera 8 such that the irradiation areas VR and VL of pulse light are switched and imaged at the first and second timings. In this way, the high-speed camera 8 acquires an image (a first image) Ia shown in FIG. 11(*a*), at the first timing, and acquires an image (a second image) Ib shown in FIG. 11(*b*), at the second timing. For example, the first image Ia of FIG. 11(*a*) includes an image of reflected light PL from the pedestrian P included in the irradiation area VR from the vehicle V, and an image of light VAL emitted from the light emitting unit VA5 of the oncoming vehicle VA to the irradiation area VAF partially overlapping the imaging area S of the high-speed camera 8. Meanwhile, the second image Ib of FIG. 11(*b*) does not include an image of the pedestrian P since the pedestrian P is not included in the irradiation area VL from the vehicle V, and includes only an image of the light VAL emitted from the light emitting unit VA5 of the oncoming vehicle VA. The high-speed camera 8 outputs the first image Ia and the second image Ib to the image processing unit 110. The image processing unit 110 compares the first image Ia and the second image Ib, and distinguishes between the reflected light of the light emitted from the vehicle V and the other light. In other words, the image processing unit 110 determines that the light VAL emitted from the light emitting unit VA5 and included in an area which the light emitting unit 5 are not irradiating in FIG. 11(*b*) (an area corresponding to the irradiation area VR of FIG. 11(*a*)) is not reflected light of the light emitted from the light emitting unit 5 of the vehicle V. The image processing unit 110 removes the light VAL as noise, i.e. sets 0 as the luminance values of pixels of the data corresponding to the light VAL, and generates a composite image Ic (see FIG. 11(*c*)) by composing the first image Ia and the second image Ib (an image composing step). As shown in FIG. 11(*c*), the composite image Ic does not include an image of the light VAL emitted from the oncoming vehicle VA.

In the image acquiring apparatus 102 of the second example described above, the light emitting unit 5 can emit pulse light toward a plurality of directions (for example, the right side and left side in front of the vehicle). Further, the timing controller 9 controls the light emission cycle of pulse light and imaging timings such that at the first timing, pulse light is emitted toward the right side and the reflected light of the emitted pulse light is imaged, and at the second timing, pulse light is emitted toward the left side and the reflected light of the emitted pulse light is imaged. Furthermore, the image processing unit 110 compares the first image Ia acquired at the first timing and the second image Ib acquired at the second timing, and determines whether light other than the reflected light of the light emitted from the vehicle V is imaged. If it is determined that light other than the reflected light is imaged, the image processing unit removes the corresponding light (for example, the light VAL) as noise, and combines the first image Ia and the second image Ib, thereby generating the composite image Ic. According to this configuration, it is possible to acquire accurate distance information on objects in front of the vehicle without being affected by irregular reflected light and pulse light emitted from a neighboring vehicle.

Third Example

In the second example described above, the light emitting unit 5 can emit pulse light toward the right side and left side in front of the vehicle; however, this disclosure is not limited thereto. For example, FIG. 12(*a*) shows, as a third example, an irradiation area VU of pulse light which is emitted from the light emitting unit 5 of the vehicle V at a first timing, the imaging area S of the high-speed camera 8 of the vehicle V, an irradiation area VAF of light which is emitted from the light emitting unit of the oncoming vehicle VA, and the pedestrian P on the walkway on the left side as seen from the vehicle V. Also, FIG. 12(*b*) shows an irradiation area VD of pulse light which is emitted from the light emitting unit 5 of the vehicle V at a second timing different from the first timing, the imaging area S of the high-speed camera 8 of the vehicle V, an irradiation area VAR of light which is emitted from the light emitting unit of the oncoming vehicle VA, and the pedestrian P on the left walkway. The irradiation area VU of pulse light which is emitted at the first timing is the upper irradiation area in front of the vehicle V, and the irradiation area VD of pulse light which is emitted at the second timing is the lower irradiation area of the area in front of the vehicle V. That is, the light emitting unit 5 can be configured to emit pulse light toward each of the upper side and lower side in front of the vehicle V. Also, even in the second example, the light emitting unit 5 may be mounted in the left and right head lamps, or a single light emitting unit capable of switching between the irradiation areas may be configured.

In the third example, the timing controller 9 outputs a pulse signal to the light emitting unit 5 such that, at the first timing shown in FIG. 12(*a*), pulse light is emitted toward the upper side (the irradiation area VU) in front of the vehicle, and at the second timing shown in FIG. 11(*b*), pulse light is emitted toward the lower side (the irradiation area VD). Also, the timing controller 9 outputs an opening/closing command signal to the gate 7*a* while outputting a command signal to the high-speed camera 8, such that the reflected light of pulse light is imaged at each of the first timing and the second timing.

As described above, the timing controller 9 controls the operations of the light emitting unit 5, the gate 7*a*, and the high-speed camera 8. As a result, the image processing unit 110 acquires an image Id acquired at the first timing shown in FIG. 11(*a*), and an image Ie acquired at the second timing shown in FIG. 11(*b*). The image Id of FIG. 12(*a*) includes an image of reflected light PU from the upper body of the pedestrian P included in the irradiation area VU from the vehicle V, and an image of the light VAL emitted from the light emitting unit VA5 of the oncoming vehicle VA to the irradiation area VAF partially overlapping the imaging area S of the high-speed camera 8. Meanwhile, the image Ie of FIG. 12(*b*) includes an image of reflected light PD from the lower body of the pedestrian P (and images of reflected light from lane marks on the road) included in the irradiation area VD from the vehicle V, and an image of the light VAL emitted from the light emitting unit VA5 of the oncoming vehicle VA. The image processing unit 110 compares the image Id and the image Ie, and distinguishes between the reflected light of the light emitted from the vehicle V and the other light. In other words, the image processing unit 110 determines that the light VAL emitted from the light emitting unit VA5 and included in an area which the light emitting unit 5 is not irradiating in FIG. 12(b) (an area corresponding to the irradiation area VU of FIG. 12(a)) is not reflected light of the light emitted from the light emitting unit 5 of the vehicle V. The image processing unit 110 removes the light VAL as noise, i.e. sets 0 as the luminance values of pixels of the data corresponding to the light VAL, and generates a composite image If (see FIG. 12(c)) by composing the image Id and the image Ie. As shown in FIG. 12(c), the composite image If does not include an image of the light VAL emitted from the oncoming vehicle VA.

As described above, even in the third example, the obstacle detecting apparatus emits pulse light from the light emitting unit 5 toward the upper side and lower side in front of the vehicle at different timings, and compares the image Id and the image Ie, and removes light other than the reflected light of the light emitted from the vehicle V, as noise, and generates the composite image If. Therefore, it is possible to acquire accurate distance information without being affected by irregular reflected light and pulse light which is emitted from neighboring vehicles.

Although the embodiments of this disclosure has been described based on the first to third examples, the specific configuration of this disclosure is not limited to the configurations of the examples, and design change, addition, and so on are allowed unless they depart the gist of the inventions according to claims.

In one or more of the above-described embodiments, the timing controller 9 controls the light emission cycle tP of the light emitting unit 5 such that the light emission cycle tP is modulated by random numbers; however, this disclosure is not limited to this example. For example, the timing controller may be configured to control the light emission cycle and imaging timings of the vehicle by communicating with a neighboring vehicle such that the light emission cycle and imaging timings of the vehicle are not the same as the light emission cycles of pulse light which is emitted from the neighboring vehicle. In other words, by acquiring information on the light emission cycles of pulse light from the neighboring vehicle by performing vehicle-to-vehicle communication or the like, the timing controller modulates the light emission cycle and imaging timings of the vehicle such that they are different from the light emission cycles of the neighboring vehicle. In this way, the light emission cycle and imaging timings of pulse light of the vehicle are controlled. Therefore, it is possible to acquire accurate distance information unaffected by light from a neighboring vehicle.

Also, the timing controller may be configured to control the light emission cycle and imaging timings based on the direction and location of the vehicle. By modulating each light emission cycle including a basic interval period and a random-number interval period according to the direction and location of the vehicle, it is possible to control the light emission cycle and imaging timings of the vehicle such that they are not the same as the light emission cycles of pulse light from a neighboring vehicle different from the vehicle in their directions and locations. Also, direction information on the direction in which the vehicle is moving can be acquired by, for example, a geometric sensor mounted on the vehicle, and information on the location of the vehicle can be acquired, for example, from a navigation system mounted on the vehicle and having map data and GPS (Global Positioning System) data.

For example, the imaging object length, the amount of change in the imaging object distance, the number of frames for each target distance range, and so on can be appropriately set according to the performance of the high-speed camera 8 and the image processing unit 3 (the image processing unit 110).

In one or more of the above-described embodiments, as shown in FIG. 1, the high-speed camera 8 functions as an image acquisition unit; however, this disclosure is not limited to this example. For example, the image processing unit 3 (the image processing unit 110) may have the function of an image acquisition unit, or a separate memory for storing images may be provided as an image acquisition unit between the high-speed camera 8 and the image processing unit 3 (the image processing unit 110).

In one or more of the above-described embodiments, as shown in FIG. 1, the light intensifying unit 7 (the gate 7a and the image intensifier 7b) is installed between the objective lens 6 and the high-speed camera 8; however, this disclosure is not limited to this example. For example, without installing the light intensifying unit 7, it is possible to acquire a plurality of images by performing gating in the high-speed camera 8 at predetermined imaging timings.

In one or more of the above-described embodiments, object recognition is performed by generating distance image data by the image processing unit 3; however, objects may be recognized from images of respective target distances acquired by the high-speed camera 8.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An image acquiring apparatus for a vehicle comprising:
   a light emitting unit configured to emit pulse light to a predetermined direction;
   an image acquisition unit configured to acquire a plurality of different images of target distance ranges by imaging reflected light returning from the target distance ranges at imaging timings set according to the target distance ranges; and
   a timing controller configured to control a light emission cycle of the pulse light and the imaging timings, the light emission cycle representing a timing difference between two consecutive light emissions,
   wherein the timing controller is configured to control the light emission cycle and the imaging timings such that the light emission cycle and the imaging timings are modulated by random numbers, and
   wherein the timing controller is configured to modulate the light emission cycle and the imaging timings by adding a time generated randomly to each of a basic interval period of the light emission cycle and a basic interval period of the imaging timings.

2. The image acquiring apparatus according to claim 1, wherein the timing controller is configured to perform control such that a part of the basic interval period is changed for the target distance ranges, and
   wherein the timing controller is configured to perform control such that the time generated randomly is added to each of the different basic interval periods for the different target distance ranges.

3. A control device for controlling an image acquiring apparatus for a vehicle, the vehicle comprising:
- a light emitting unit configured to emit pulse light to a predetermined direction, and
- an image acquisition unit configured to acquire a plurality of different images of target distance ranges by imaging reflected light returning from the target distance ranges at imaging timings set according to the target distance ranges, the control device comprising:
- a controller configured to control a light emission cycle of the pulse light and the imaging timings such that the light emission cycle and the imaging timings are modulated by random numbers, wherein the light emission cycle representing a timing difference between two consecutive light emissions, and wherein the controller is configured to modulate the light emission cycle and the imaging timings by adding a time generated randomly to each of a basic interval period of the light emission cycle and a basic interval period of the imaging timings.

4. An image acquiring method for a vehicle, comprising:
acquiring a plurality of different images of target distance ranges by imaging reflected light of pulse light emitted to a predetermined direction while changing imaging timings; and controlling a light emission cycle of the pulse light and the imaging timings such that the light emission cycle and the imaging timings are modulated by random numbers, wherein the light emission cycle represents a timing difference between two consecutive light emissions, and wherein modulating the light emission cycle and the imaging timings comprises adding a time generated randomly to each of a basic interval period of the light emission cycle and a basic interval period of the imaging timings.

5. A vehicle comprising:
the image acquiring apparatus according to claim 1.

6. The control device according to claim 3,
wherein the timing controller is configured to perform control such that a part of the basic interval period is changed for the target distance ranges, and
wherein the timing controller is configured to perform control such that the time generated randomly is added to each of the different basic interval periods for the different target distance ranges.

7. The image acquiring method according to claim 4,
wherein the controlling includes performing control such that a part of the basic interval period is changed for the target distance ranges, and
wherein the time generated randomly is added to each of the different basic interval periods for the different target distance ranges.

* * * * *